United States Patent Office 3,313,331
Patented Apr. 11, 1967

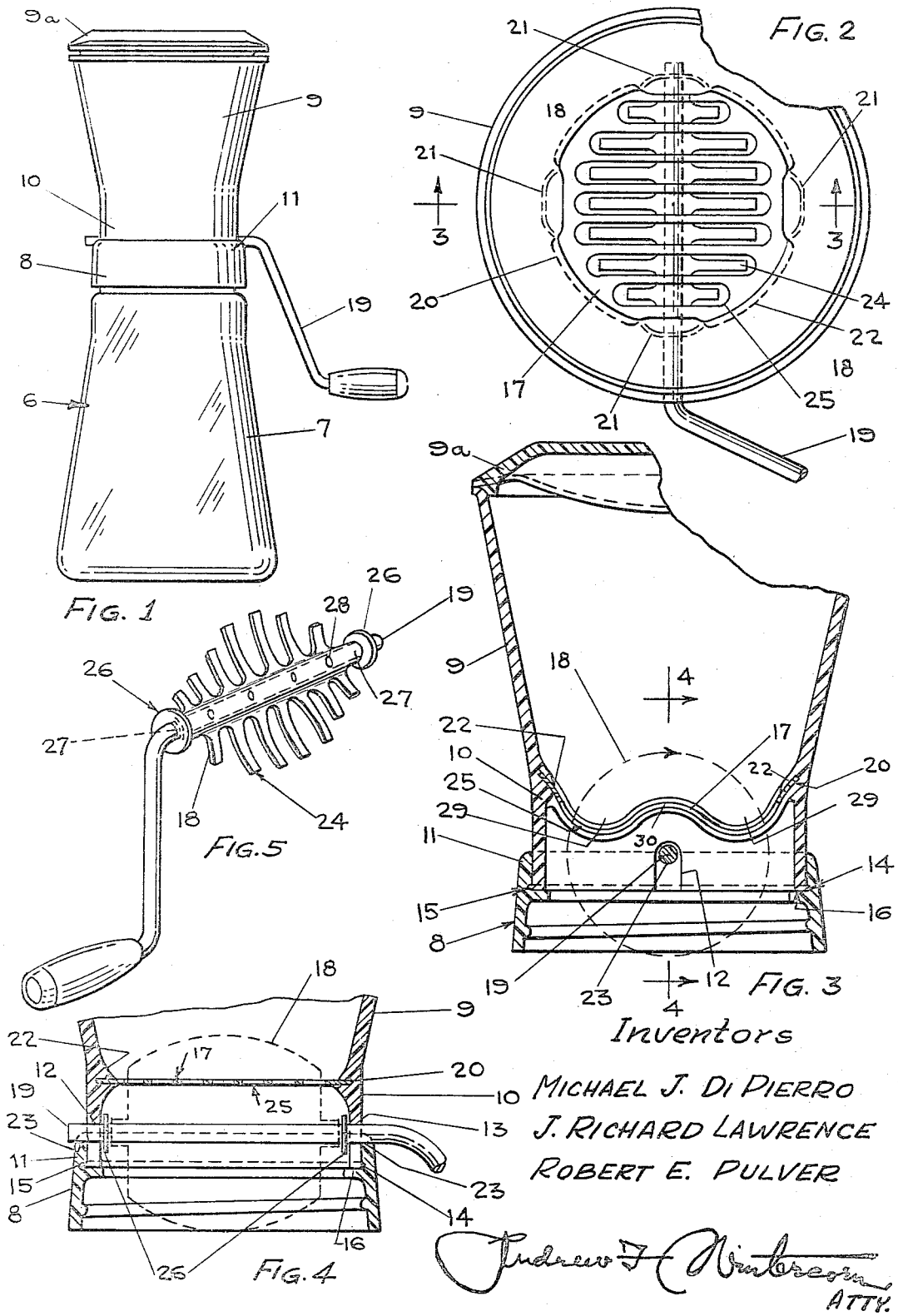

3,313,331
NUT MEAT CHOPPER
Michael J. Di Pierro, Shrewsbury, and J. Richard Lawrence, Worcester, Mass., and Robert E. Pulver, Rockford, Ill., assignors to The Washburn Company, Worcester, Mass., a corporation of Massachusetts
Filed June 29, 1964, Ser. No. 378,820
8 Claims. (Cl. 146—123)

This invention relates to nut meat choppers of the rotary type disclosed in Sundstrand Patent 2,001,075 utilizing a stationary undulated slotted plate in the hopper and a rotary toothed cutter bar on a shaft turned relative to it by means of a crank, the nut particles to be chopped resting in troughs in the undulated slotted plate through which teeth of the cutter bar appropriately bent for best chopping efficiency operate to chop the nuts regardless of which direction the crank is turned.

Our invention is concerned mainly with:

(1) A unique combination of the plastic cap and hopper parts whereby they can be assembled with a snap-fit, while registering slots and notches in these interfitting parts provide bearings for the crankshaft, and the shaft holds the assembled parts against turning relative to one another, this method of assembly also enabling taking the chopper apart for thorough cleaning of all areas for good sanitation;

(2) Molding the hopper of a suitable plastic material, such as polypropylene, with the wall thickness throughout held at a minimum in accordance with good practice while just enough additional thickness is provided around the periphery of the undulated circular slotted plate to hold it securely and seal the joint from above and below all around the periphery, making not only a strong and durable construction but one that can be kept thoroughly cleaned easily as there are no crevices in which nut particles might easily lodge and spoil, the plate by reason of its undulations transversely being of course securely locked against turning with respect to the hopper despite its circular form and the circular form of the hopper, and (3) The toothed cutter bar is in the form of a stamped and formed sheet metal plate with an arculately dished longitudinal mid portion which fits onto the round wire of the crank shaft and permits spot-welding the parts together for a low cost and yet highly efficient part of the nut meat chopper.

The invention as illustrated in the accompanying drawing, in which:

FIG. 1 is a side view of a nut meat chopper made in accordance with our invention;

FIG. 2 is a plan view of the hopper with the lid removed to show the slotted plate as an insert in the plastic molded hopper and to show also the radius of operation with respect to the plate of the teeth of the cutter bar disposed beneath the plate, this view being on an enlarged scale;

FIG. 3 is a cross-section on line 3—3 of FIG. 2 of the entire top assembly including the removable lid and indicating by a dotted circle the radius of operation of the toothed cutter bar with respect to the undulated slotted plate;

FIG. 4 is a fragmentary sectional view on the line 4—4 of FIG. 3 showing the crankshaft in full lines but indicating the toothed cutter bar only in dotted outline, and FIG. 5 is a perspective view of the crank and toothed cutter bar assembly removed from the hopper and shown approximately full size.

The same reference numerals are applied to corresponding parts throughout these views.

Referring to the drawing, our improved nut meat chopper is indicated generally by the reference numeral 6 in FIG. 1 and comprises a jar 7 usually of glass, a plastic screw-on cap 8, and a plastic hopper 9 and lid 9a. The lower cylindrical portion 10 of the hopper has a close telescoping fit in the rim 11 of the cap 8, and, being slotted on diametrically opposite sides, as indicated at 12 and 13, is compressible radially to the slight extent necessary to allow the annular bead 14 provided on the lower end of portion 10 to snap into an annular groove 15 provided therefor in the cap 8 immediately above an annular shoulder 16, whereby to permit removal of the cap 8 from the lower end of the hopper for cleaning purposes. All areas on the inside and outside of the parts 8 and 9 are then readily accessible and there is no likelihood of nut particles remaining lodged in crevices and becoming moldy. When the hopper is removed from the cap, the chopping means consisting of the stationary undulated circular slotted metallic plate 17 and cooperating rotary toothed metallic cutter bar 18 on crankshaft 19 are also in disassembled relation to one another and can therefore be cleaned thoroughly without any difficulty. This insures good sanitation and eliminates one of the most serious objections that housewives had to many designs of nut meat choppers that were heretofore available.

The undulated slotted circular plate 17 is inserted in the mold in the molding of the hopper 9 so that its edge portions 20, on which circumferentially spaced projections 21 may be provided, as shown in FIG. 2, are embedded in the plastic material, as shown at 22, throughout the periphery of said plate. The projections 21 may be dispensed with because, due to the undulated form of the plate 17, there is no likelihood of the plate ever working loose and turning in the hopper, despite the circular form of the plate 17 and circular form of the hopper. There are notches 23 provided in the upper edge of the rim 11 on the screw cap 8 in registering relation to slots 12 and 13 in the lower end portion of the hopper 9, and these notches and slots cooperate to provide bearings for the crankshaft 19, as clearly appears in FIGS. 3 and 4. Thus, the shaft 19, besides finding good bearing support in the joint between the parts 8 and 9 of the top assembly of the nut meat chopper, serves also to hold the hopper 9 against turning with respect to the cap 8, thereby keeping the slotted plate 17 in the correct relationship to the cutter bar 18, so that there will never be any danger of any of the teeth 24 of the cutter bar scraping on either side of the slots 25 in the plate 17. In order to keep the cutter bar 18 centered properly with respect to plate 17 we provide washers 26 on the shaft 19 to space the opposite ends of the cutter bar 18 correctly with respect to the slotted portions 12 and 13 of the lower end portion 10 of the hopper 9, as seen in FIG. 4.

The cutter bar 18 is in the form of a sheet metal stamping having an arched longitudinal mid portion 27, as clearly seen in FIG. 5 to conform to the round wire from which the crankshaft 19 is made, and this facilitates aligning the cutter bar 18 properly with respect to the shaft 19 before the two parts are spot-welded together at longitudinally spaced intervals, as indicated at 28, for a permanent and inexpensive connection.

In operation, the nut meats and peanuts to be chopped are placed in the hopper 9 and as the teeth 24 move through the spaced troughs 29 defined by the undulations of the plate 17 the nut meats or other material to be chopped are chopped up, regardless of which direction the crank 19 is turned, although it is usually turned in a clockwise direction as indicated by the arrow in FIG. 3. The nut meats and other material are chopped to the desired uniform size quickly and easily and without cutting or crushing the same and losing whatever oil is present, that having been a serious objection to other devices used in the past. The present device can also be used to good advantage for chopping up olives, cherries, hard-boiled eggs and many other foods used for sandwich fillings, salads, and so forth. The device can also be inverted with the lid removed and used in sprinkling the cut up material, on a cake, for example, and, in so doing, the crank can be turned in either direction to do further chopping of material in trough 30 and also to regulate the discharge of the material through the hopper. If the housewife wishes to store a supply of chopped up nut meats or other material, the top assembly 8–9 can be removed and any screw-on cap for a jar of the same size as the jar 7 can be applied to seal the jar and thus better preserve the chopped nut meats or other material for future use. The polypropylene material used in the molding of the parts 8, 9 and 9a is preferred because it is chip-proof, dishwasher proof, and not affected by boiling water, besides having the toughness and durability as well as resilience required.

It is believed the foregoing description conveys a good understanding of the objects and advantages of our invention. The appended claims have been drawn to cover all legitimate modifications and adaptations.

We claim:

1. In a material chopping device of the character described comprising a hopper, a slotted plate across the lower portion of said hopper on which the material to be chopped is supported, and a rotary cutter having projections all disposed substantially in a common plane through the axis of rotation movable through the slots in said plate to chop the material between said plate and projections, the device being adapted to be mounted in fixed relation to the top of a container, whereby material placed in said hopper and chopped will drop into said container and may be dispensed from said container through the slotted plate when the container is inverted and the rotary cutter is turned, the improvement which consists in providing the hopper of circular form and molded of plastic material, the slotted plate being disposed inside the hopper and being also of circular form but being undulated to provide two parallel material retaining troughs transversely of said plate spaced on opposite sides of the center of said plate and hopper to facilitate chopping of the material with the rotary cutter turned in either direction, one trough being used in one direction of rotation of the cutter and the other trough in the opposite direction of rotation, said plate having its edges embedded in said plastic material so that it serves to seal the joint between the edges of said plate and said hopper, the undulations positively preventing turning of said circular plate relative to said circular hopper, the slotted plate in the inverted position of the container and chopping device defining another material retaining trough diametrically thereof between the first mentioned two material retaining troughs to facilitate further chopping of the material and also to regulate the discharge of the material through the hopper with the rotary cutter turned in either direction.

2. In a material chopping device of the character described comprising a hopper, a container on top of which said hopper is to be mounted whereby material placed in said hopper and chopped will drop into said container, a cap for said container to support the lower portion of said hopper thereon, a slotted plate disposed transversely of and in the lower portion of said hopper, a rotary toothed cutter substantially horizontally disposed below the plate with the teeth thereof arranged to extend through the slots therein to chop material between the teeth and plate, and a rotary shaft affixed to said cutter to turn the same, the improvement which consists in providing the cap and the lower portion of said hopper with telescoping portions, means to secure said hopper and cap in assembled relation, one of said telescoping portions having slots provided in diametrically opposite sides thereof in which the shaft is rotatably received to provide bearing support therefor, whereby the cap and hopper when assembled maintain the shaft and toothed cutter in assembled relation to the rest of the chopping device; the slots being in the lower end portion of the hopper which fits inside the cap, the slots making the lower portion of the hopper radially compressible, the hopper being constructed of resilient material so as to tend to return to original diameter after compression, the means to secure said hopper and cap in assembled relation comprising an annular groove in one of said hopper and cap elements and an annular projection on the other of said elements arranged to enter said groove, whereby said hopper is adapted to be secured on said cap.

3. A chopping device as set forth in claim 2 wherein the interfitting groove and projection form a detachable connection enabling disassembling the hopper from the cap and removing the shaft and cutter.

4. In a material chopping device of the character described comprising a hopper having a substantially vertical cylindrical tubular lower end portion, a slotted plate mounted in said end portion transversely thereof, a support for said hopper having a substantially vertical cylindrical neck portion adapted to receive therein the lower end portion of said hopper, the latter having an annular bead thereon and being constructed of resilient material and having vertical slots provided in diametrically opposed portions thereof permitting compression of said lower end portion to permit entering the beaded portion into said neck, the neck having an annular internal groove provided therein to receive said annular bead, the neck tending to return to original diameter to enter said bead in said groove, and a substantially horizontal shaft entered in said slots for bearing support under said plate and having a toothed cutter fixed thereon and operating through the slots in said plate to chop material resting thereon.

5. A chopping device as set forth in claim 4 wherein the neck has notches provided in the upper end thereof registering with the slots and receive the shaft to further provide bearing support for said shaft and also cause the shaft to hold the hopper against turning relative to said neck and thereby maintain the slotted plate in operative relation to said cutter.

6. A chopping device as set forth in claim 4 wherein the bead is detachably engaged in said groove to permit disassembly of the hopper from the neck and disassembly of the cutter and shaft from the hopper.

7. A chopping device as set forth in claim 4, wherein the hopper is of resilient molded plastic material, having the resilience requisite for the detachable snap fit of the annular bead on the hopper in the annular groove in the neck, the slotted plate being of metal and having its marginal edge portions embedded in the plastic material of the hopper to hold it securely and seal the joint between the plate and hopper all around the periphery of the plate.

8. In a material chopping device of the character described comprising a hopper element of molded plastic material, a container on top of which said hopper is mounted, whereby material placed in said hopper and chopped will drop into said container, a cap element of molded plastic material for said container to support the lower portion of said hopper thereon, the hopper element and cap element being both circular in cross-section, a substantially horizontal slotted metallic plate of circular form disposed transversely in the lower portion of said hopper and cap assembly and having its marginal edge portions embedded in the plastic material of one of said hopper and cap elements to hold it securely against turning relative to said assembly, a metallic shaft extending diametrically of the cap element and rotatable in bearing notches provided in the top of diametrically opposite sides of the cap, said shaft carrying toothed metallic cutter means arranged to extend through the slots in the plate to chop material between the teeth and plate, the upper portion of the cap and the lower portion of the hopper interfitting in telescoping relation so that the hopper element retains the shaft in the bearing notches in the cap, means to secure said telescoping portions in assembled relation, and means in the assembly through which the shaft extends to maintain accurate registration of the teeth of the cutter means with the slots in the plate.

References Cited by the Examiner

UNITED STATES PATENTS

| | | | |
|---|---|---|---|
| 2,001,075 | 5/1935 | Sundstrand | 146—123 |
| 2,121,453 | 6/1938 | Sundstrand | 146—122 |
| 2,280,211 | 4/1942 | Bernhardt | 146—123 |
| 3,029,851 | 4/1962 | Zysset | 146—160 |
| 3,115,172 | 12/1963 | Meurer Von Inffeld | 146—160 X |

FOREIGN PATENTS 82,561 12/1956 Denmark.

WILLIAM W. DYER, JR., *Primary Examiner.*

W. GRAYDON ABERCROMBIE, *Examiner.*